United States Patent [19]

Osman

[11] Patent Number: 4,833,228

[45] Date of Patent: May 23, 1989

[54] LINEAR RODLIKE POLYESTERS

[76] Inventor: Maged A. Osman, Lerchenrain 1, CH 8046 Zürich, Switzerland

[21] Appl. No.: 169,444

[22] Filed: Mar. 17, 1988

[30] Foreign Application Priority Data

Mar. 19, 1987 [EP] European Pat. Off. ........ 87810156.7

[51] Int. Cl.$^4$ ............................................. C08G 63/00
[52] U.S. Cl. ................................... 528/176; 528/185; 528/212; 528/219; 528/272; 528/295; 528/308
[58] Field of Search ............... 528/176, 185, 212, 219, 528/272, 295, 308

[56] References Cited

U.S. PATENT DOCUMENTS

| | | | |
|---|---|---|---|
| 4,067,852 | 1/1978 | Calundann | 528/190 |
| 4,102,864 | 7/1978 | Deex et al. | 528/173 |
| 4,118,372 | 10/1978 | Schaefgen | 528/190 |
| 4,161,470 | 7/1979 | Calundann | 524/599 |
| 4,184,999 | 1/1980 | Olander | 524/141 |
| 4,219,461 | 8/1980 | Calundann | 528/173 |
| 4,327,206 | 4/1982 | Jackson, Jr. et al. | 528/179 |

FOREIGN PATENT DOCUMENTS

| | | |
|---|---|---|
| 28030 | 5/1981 | European Pat. Off. . |
| 72540 | 2/1983 | European Pat. Off. . |
| 139924 | 5/1985 | European Pat. Off. . |
| 212944 | 3/1987 | European Pat. Off. . |
| 989552 | 4/1965 | United Kingdom . |
| 993272 | 5/1965 | United Kingdom . |

Primary Examiner—Maurice J. Welsh
Assistant Examiner—S. A. Acquah
Attorney, Agent, or Firm—Wigman & Cohen

[57] ABSTRACT

A linear rodlike polyester of controlled rigidity and packing density which melts below 350° C. and consists essentially of recurring units of the formula (1)

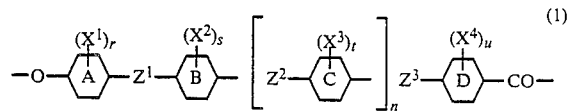

in which A, B, C and D are the same or different cyclic moieties selected from the group consisting of 1,4-phenylene and 1,4-cyclohexylene; n is Zero or 1; $Z^1$, $Z^2$ and $Z^3$ are the same or different and are selected from the group of bivalent links consisting of the covalent bond (—) and of linkages —COO—, —OOC—, —CH$_2$CH$_2$—, —CH$_2$O—, —OCH$_2$—, —OCH$_2$CH$_2$O—, —OCH$_2$OCH$_2$— and —CH$_2$OCH$_2$O—; $X^1$, $X^2$, $X^3$ and $X^4$ are the same or different and are selected from the group consisting of aliphatic substituents consisting of 2 to 8 carbon atoms in a straight or branched chain in which one, two or three of said carbon atoms may be replaced by oxygen atoms such that any said oxygen atom is directly attached to two of said carbon atoms of said chain; r, s, t and u are selected from the group consisting of Zero and integers of 1 to 4; certain provisos must be observed to achieve optimum properties.

10 Claims, No Drawings

LINEAR RODLIKE POLYESTERS

BACKGROUND OF THE INVENTION (1) Field of the Invention

The invention relates to novel polyesters of the linear and rodlike type consisting essentially of specified recurring units that will not only ascertain melting points of below 350° C. but also provide controlled rigidity and packing density of the macromolecules. Further, the invention relates to polymer blends containing the novel polyesters; to copolyesters that contain the specified recurring units; th articles of manufacture consisting of the novel polyesters, polymer blends, or copolyesters; and to methods of producing novel polyesters.

(2) Description of the Prior Art

It is known in the art that polymers with greatly improved mechanical properties can be obtained if the coiled chains of conventional thermoplastic polymers, such as polyethylene, are stretched such that the molecules attain a more or less rodlike structure. Such rodlike macromolecules, however, can be easily obtained in polymers whose recurring units mainly consist of cyclic units, e.g. phenylenic or naphthenic and sometimes cycloaliphatic moieties linked typically by covalent bonds, carboxyl or amide groups.

Yet, when the molecular chains of conventional polyamides were made more rigid by incorporation of phenylenic moieties, the resulting aromatic polyamides or aramides (e.g. KEVLAR, reg. trademark by E. I. DuPont), while showing subtantially improved mechanical properties, were not processable in the molten state and are only soluble in unusual or corrosive solvents, such als sulphuric acid.

In an analogous manner the backbone chains of polyesters have been modified so as to improve mechanical and other properties by increasing the rigidity of the polymer chains. However, when significant improvements of the mechanical properties were achieved, the resulting linear polyesters did not melt below, or not substantially below, their decomposition temperature and the solubility in organic solvents was poor at best.

Numerous attempts towards improved polyesters have been disclosed in the literature, e.g. in the following patent specifications: GB Pat. No. 989,552 and 993,272; U.S. Pat. Nos. 4,067,852, 4,102,864, 4,118,372, 4,161,470, 4,184,999, 4,219,461, 4,327,206: EP Pat. Nos. 28,030, 72,540, 139,924 and 212,944. The teachings of these patents can be summarized in that polyester-type condensates having rigid and/or rodlike chains with excellent mechanical properties can be obtained but that high melt processing temperatures will be required if the products can be processed by such methods at all. Further, previous attempts to modify the rodlike molecules are based upon the introduction of either flexible aliphatic groups as links between the aromatic moieties, or by introducing "kinks", i.e. elements of controlled angularity in the links between adjacent cyclic moieties, into the rodlike polymer chains. In both cases the macromolecules will not be rodlike; further, rigidity of the polymer molecules may be lost or substantially decreased by such modifications and, while melting temperatures in the range of between 250° and 350° C. were reported for such polymers, the mechanical properties of the melt processed polymers have been adversely affected to the point that little if any improvements of practical importance were achieved.

Specifically, if kinks were introduced into the molecular chain of prior art rodlike polyesters, this was done by using the ortho- or meta-isomers instead of the para-constituents, or by interconnecting the cyclic moieties via linkages that contain an odd number of atoms in the backbone or main chain, e.g. one or three and not two or four atoms, between adjacent cyclic moieties.

Further, some prior art patents disclose or claim copolyesters in which the recurring units or parts thereof are undefined and where the polymer chain is allowed to include non-fusible segments so that the resulting molecules cannot be properly oriented upon processing. This, in turn, will cause mechanical defects in the oriented structure leading to an appreciable deterioration of the mechanical properties of the resulting material.

Finally, the art includes many generic structures without the specific support required to derive a generally operable teaching of commensurable scope.

Accordingly, it is the object of the present invention to provide well-defined linear rodlike polyesters, i.e. having rodlike chains, in which the chain rigidity and packing density can be controlled so as to provide melting temperatures in the range of from 100° to 350° C. without an offsetting loss of mechanical properties.

SUMMARY OF THE INVENTION

This object and further advantages apparent from the subsequent specification will be achieved according to the invention by a novel group of linear rodlike polyesters that consist essentially, e.g. of from 80 to 100 mol % of recurring units of the formula (1)

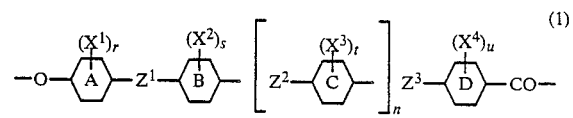

in which A, B, C and D are the same or different cyclic moieties selected from the group consisting of 1,4-phenylene and 1,4-cyclohexylene; n is Zero or 1; $Z^1$, $Z^2$ and $Z^3$ are the same or different and are selected from the group of bivalent links consisting of the covalent bond (—) and of linkages —COO—, —OOC—, —CH$_2$CH$_2$—, CH$_2$O—, —OCH$_2$—, —OCH$_2$CH$_2$O—, —OCH$_2$OCH$_2$——CH$_2$OCH$_2$O—; $X^1$, $X^2$, $X^3$ and $X^4$ are the same or different and are selected from the group consisting of aliphatic substituents consisting of 2 to 8 carbon atoms in a straight or branched chain in which one, two or three of said carbon atoms may be replaced by oxygen atoms such that any said oxygen atom is directly attached to two of said carbon atoms of said chain; r, s, t and u are selected from the group consisting of Zero and integers of 1 to 4, preferably 1 to 2; with the provisos:

(a) that not more than two of $Z^1$, $Z^2$, $Z^3$ are —OCH$_2$CH$_2$O—, —OCH$_2$OCH$_2$— or —CH$_2$OCH$_2$O—;

(b) that at least one of r, s, t and u is not Zero;

(c) that not all of $Z^1$, $Z^2$ and $Z^3$ are the covalent bond or —COO— or —OOC— when all of A, B, C and D are 1,4-phenylene; and (d) that any of r, s, t and u is a least 2 when the corresponding cyclic moiety is an alkyl-substituted 1,4-phenylene linked directly to two oxygen atoms.

The structure of the recurring units according to the invention as defined in formula (1) above is limited with regard to the cyclic moieties A, B, C and D, the linkages $Z^1$, $Z^2$ and $Z^3$ as well as the substituents $X^1$, $X^2$, $X^3$ and $X^4$, and is further specified by the provisos (a), (b), (c) and (d).

Proviso (a) limits the maximum portion of certain linkages $Z^1$, $Z^2$, $Z^3$; if this proviso is not observed in essence, the resulting polyester chain will have too much flexibility or, in other words, their rigidity will not be controlled; according to a preferred embodiment of proviso (a) at least one of $Z^1$, $Z^2$ and $Z^3$ is —COO— or —OOC—. The formulae —COO— and —OOC— herein always represent carboxyl and oxycarbonyl.

Proviso (b) defines that each recurring unit of formula (1) will include a minimum degree of what is also called "lateral substitution" herein, i.e. substitution of the cyclic moieties by substituents $X^1$, $X^2$, and $X^3$ and $X^4$ which each consists of an aliphatic chain of at least two and not more than eight carbon atoms; in such a chain, one, two or three carbon atoms may be replaced by oxygen atoms provided that each such oxygen atom is directly connected to two aliphatic carbon atoms in the lateral substituent.

Proviso (b) again is critical in that the packing density would be too high and out of control if the recurring units of formula (1) did not contain at least one lateral substituent $X^1$, $X^2$, $X^3$, $X^4$ as defined.

Proviso (c) serves to exclude excessive, i.e. uncontrolled, rigidity because recurring units of formula (1) in which all of $Z^1$, $Z^2$ and $Z^3$ are selected from covalent bonds and —COO— or —OOC— would yield a molecular structure with too much rigidity if all cyclic moieties A, B, C and D are 1,4-phenylene groups.

Proviso (d) excludes less preferred species.

Futher, by way of definition, the term "rodlike polyester" is used herein to preclude polyesters that include kinks in their chains while the term "linear" is intended to refer to a molecular structure which does not show the effects of a coiled molecular chain. Such macromolecules are geometrically anisotropic and when their clearing points are higher than their melting points they will exhibit optical anisotropy, i.e. a liquid-crystalline state.

Novel polyesters with recurring units of formula (1) can be obtained by polycondensation methods of the type known per se for production of linear polyesters, e.g. by polycondensation in the molten state, or in solution or suspension, or by interfacial polymerization methods.

Starting compounds of the carboxylic (both reactive groups of the reactant molecule being carboxy groups), hydroxylic (both reactive groups of the reactant molecule being hydroxy) and carboxy/hydroxylic type (one reactive group of the molecule being carboxyl, the other hydroxyl) can be used. Suitable reactants are known per se or can be obtained by conventional methods from known compounds. Specifically, lateral substituents $X^1$ to $X^4$ can be introduced into the corresponding unsubstituted compounds, e.g. by alkylation methods, by acylation methods followed by reduction, etc.

PREFERRED EMBODIMENTS OF THE INVENTION

According to a preferred embodiment the invention comprises a novel group of linear rodlike polyesters comprising the condensation product of at least one carboxylic acid or a functional derivative thereof selected from the group consisting of compounds of the formulae (11) to (14)

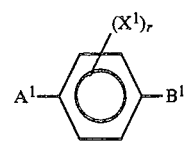

(11)

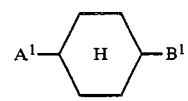

(12)

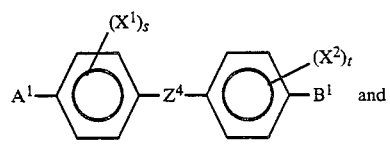

(13)

and

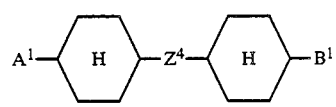

(14)

wherein $A^1$ and $B^1$ are the same or different and are selected from carboxyl, hydroxyl and functional derivatives thereof with the proviso that at least one of $A^1$ and $B^1$ is carboxyl or a functional derivative thereof; $X^1$ and $X^2$ are as defined in formula (1) above; r, s and t are as defined in formula (1) above; $Z^4$ is selected from the group consisting of the covalent bond and linkages of the formulae —$CH_2CH_2$—, —$CH_2O$—, —$OCH_2CH_2O$— and —$OCH_2OCH_2$—, with at least one hydroxy compound or a functional derivative thereof selected from the group consisting of compounds of the formulae (21) to (24)

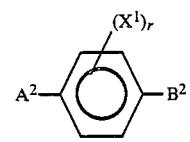

(21)

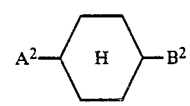

(22)

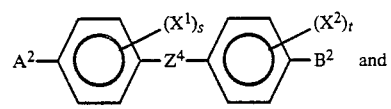

and (23)

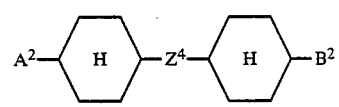

(24)

wherein $A^2$ and $B^2$ are the same or different and are selected from hydroxyl, carboxyl and functional derivatives thereof with the proviso that at least one of $A^2$ and $B^2$ is hydroxyl or a functional derivative thereof; $X^1$ and $X^2$ are as defined in formula (1) above; r, s and t are as defined in formula (1) above, and $Z^4$ is as defined herein.

Further, the invention comprises a method of producing a novel polyester as defined above by condensing at least one first reactant selected from the compounds of the above-specified formulae (11) to (14) with at least one second reactant selected from the above-specified compound of formulae (21) to (24) to form said polyesters, generally under an inert atmosphere and/or under reduced pressure; preferably, the product polyester is subjected to a temperature treatment at an elevated temperature in the range of from about 150° C. to about 350° C. but below its melting point.

Further details of preferred methods of producing the novel polyesters will be explained in more detail below.

As is conventional per se in polycondensation methods, the reactive carboxyl and/or hydroxyl groups of the reactants can be modified, e.g. by using the acid halide, anhydride or reactive ester. Specific examples of suitable starting compounds will be given below.

The nature of the terminal groups of an inventive polyester may depend upon the reactants or may be modified by chain stoppers or other conventional means and the degree of polycondensation of the inventive polyester can be controlled in a manner known per se; the minimum degree needed may depend upon final use requirements. Generally, molecular weights (number-/weight average) in the film or fiber forming range of at least about 10,000 as determined by standard methods, e.g. vapor pressure, light scattering or determination of the number of end groups, e.g. by IR spectroscopy, will be suitable and molecular weights in the range of from 10,000 to 100,000 (weight or number average) will be preferred for many purposes.

Hence, a preferred polyester according to the invention will have the formula

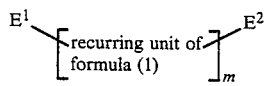

in which $E^1$ and $E^2$ will be terminal groups selected from hydrogen, hydroxy, acyl, aroyl (e.g. benzoyl, substituted benzoyl), alkoxy, phenoxy and substituted phenoxy groups in which alkyls contain 1-18 C-atoms and aryls contain 6-12 C-atoms. The inventive polyesters can be used for compounding with conventional additives, fillers, coloring agents, etc. and/or in polymer blends which, preferably, contain at least about 5% by weight of the novel polyesters, e.g. from 5 to 95% by weight, typically from about 10 to about 80% by weight thereof.

Further, copolyesters according to the invention will contain at least about 10 mol % and typically about 20 to 95 mol % of recurring units of formula (1) and may be obtained by reacting suitably substituted polyester-forming reactants and according to the invention with prior art reactants.

Articles of manufacture including fibers, fibrils, films, foils, membranes, laminates, coatings, passivation layers, encapsulating sheaths, extrudates, molding, etc. of the novel polyesters, blends containing them, e.g. fibers, films, foils, extrudates, molds, etc., can be obtained by conventional meltprocessing methods at typical processing temperatures of from 150° to 350° C. or from solutions, yet provide the advantages of improved mechanical and other properties inherent in the inventive polyesters. Such articles can be subjected to a post-heat treatment at temperatures below their melting temperatures to enhance their mechanical properties. This heat treatment can be carried out in the presence of air or an inert gas or under reduced pressure.

The invention will be further illustrated by means of the following examples in which parts and percentages are by weight. In all procedures described below for the polycondensation it is important to avoid water or moisture in the reactants, solvents, catalysts, ambient gases, equipment, apparatus, etc., and such exclusion of water or humidity is implied unless otherwise noted. Viscosity values are given in deciliter per gram at room temperature.

EXAMPLE 1

An equimolar (1:1) mixture of 1,2-bis(3-ethyl-4-acetoxyphenyl)-ethane and 2-ethyl-terephthalic acid was placed in a reactor equipped with a condenser and a mechanical stirrer. The air in the reactor space was evacuated and the reactor flushed three times with nitrogen.

The reaction (polycondensation) was effected by gradually heating the reaction mixture (under a slow stream of $N_2$) to 250° C. while stirring and maintaining this temperature for about 150 minutes. During this time acetic acid was distilled from the polymerization vessel. The temperature was then raised to 270° C. and the reactants stirred at this temperature for 60 minutes under a nitrogen flow while additional acetic acid evolved and was removed. Then the nitrogen atmosphere in the reactor was evacuated in stages to 0.1 torr, the stirring slowed down and the temperature raised to 290° C. The mixture was held under these conditions for about 30 minutes.

The polyester formed was allowed to cool down to ambient temperature, i.e. 25° C. The cooled polymer plug obtained was finely ground and dried in a forced-air oven at 100° C.

The inherent viscosity of the polymer was approximately 2 to 5 (dl/g) depending on the molecular weight. The inherent viscosity of the polyester could be increased by subjecting the finely divided polymer to a solid phase postheating treatment. This involves maintaining a flow of dry $N_2$ at atmospheric pressure through the ground polymer at 250° C. for about 24 hours. Various compounds known to accelerate or improve the transesterification can be added to catalyse the polycondensation, such as: magnesium, zinc acetate, antimony oxide, tetraisopropyl titanate, sodium acetate, calcium acetate, etc.

$C_1$–$C_8$-alkyl esters (e.g. ethyl) of the carboxylic or dicarboxylic reactant in combination with the hydroxy or dihydroxy reactant can be used instead of the above mentioned reactants.

EXAMPLES 2–10

The procedure of Example 1 was used to obtain polyesters from the following reactants (a) and (b):

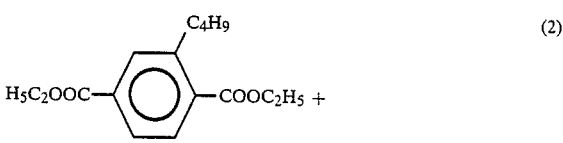

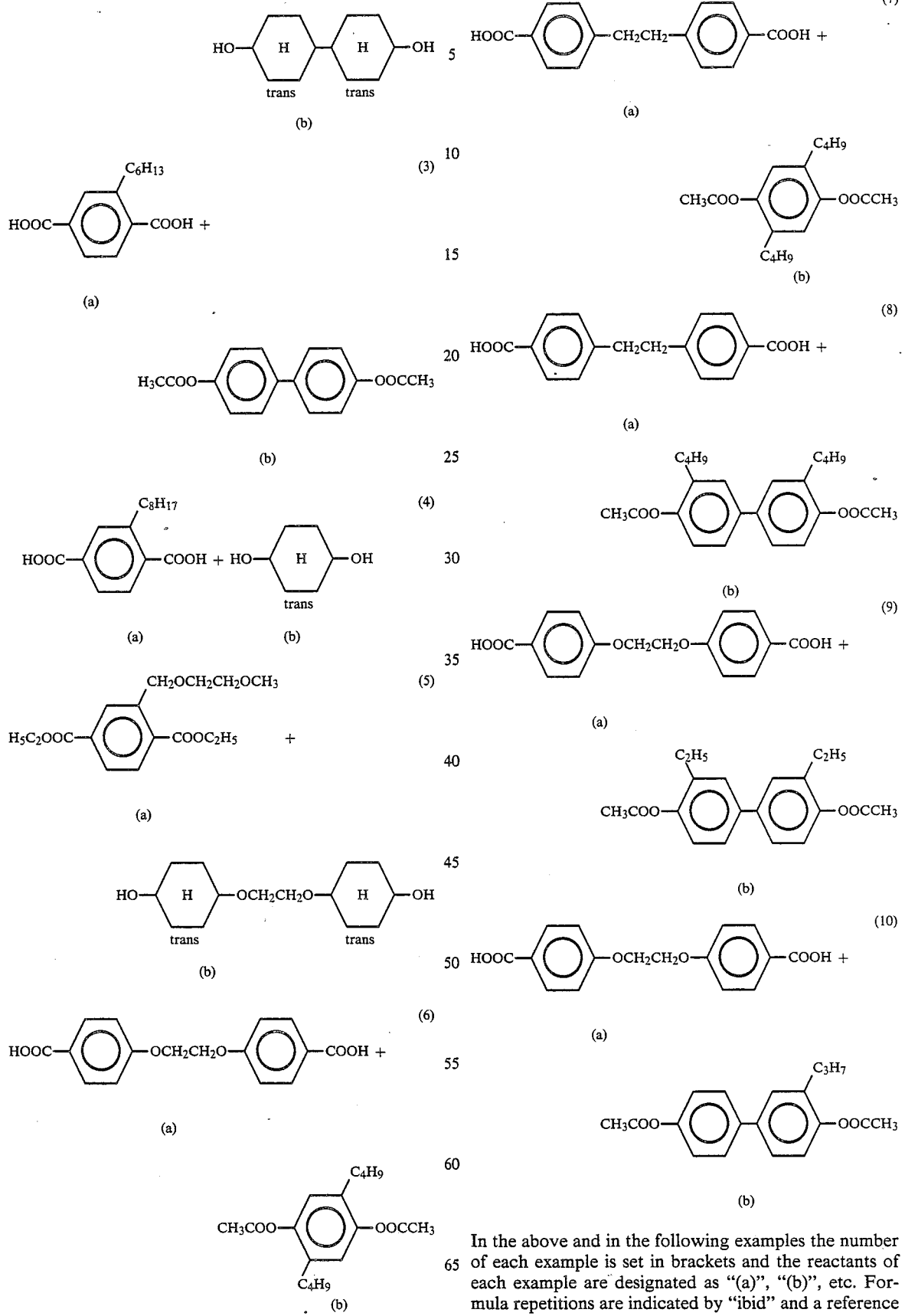
In the above and in the following examples the number of each example is set in brackets and the reactants of each example are designated as "(a)", "(b)", etc. Formula repetitions are indicated by "ibid" and a reference to the example showing that reactant formula.

EXAMPLE 11

A solution of 1 mol of 1,4-trans-cyclohexane dicarboxylic chloride in 1000 ml of sym-tetrachloroethane (TCE) was added under vigorous stirring to a cooled (0° C) solution of 1 mol of 3,3'-dibutyl-4,4'-dihydroxy biphenyl in a mixture of 1000 ml TCE and 300 ml pyridine maintained under an atmosphere of nitrogen.

The mixture was left to react for 30 minutes while stirring at 5° to 10° C., then brought up to room temperature and stirred for another 30 minutes. Finally, the reaction mixture was heated to 80° C. and maintained for 10 hours at this temperature while stirring.

The reaction product was recovered by slowly pouring the polyester solution or suspension into methanol or ethanol. The precipitated product was filtered, washed with alcohol, and dried at 80° C. under reduced pressure. The inherent viscosity of the so prepared polymer was approximately 1 (dl/g) and could be increased by the previously described postheat treatment.

A polyester of an inherent viscosity of 2 to 3 (dl/g) was also obtained by the polycondensation in the presence of a solvent as disclosed in U.S. Pat. No. 4,342,862.

EXAMPLES 12–29

The above described method in which solutions or slurries of the reactants were condensated was used to prepare polyesters from the following pairs of reactant in equimolar amounts:

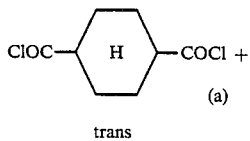
(12)
(a) trans

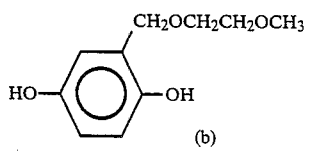
(b)

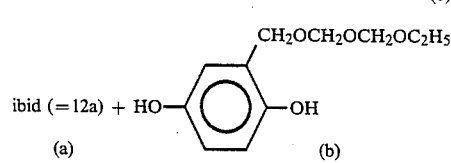
(13)

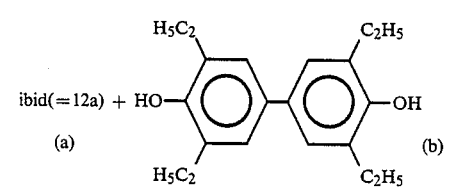
(14)

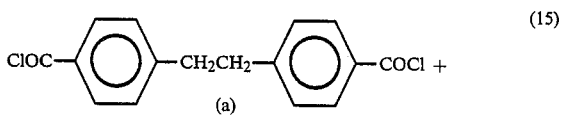
(15)

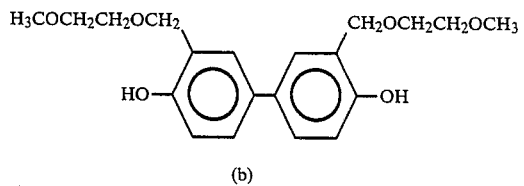

-continued

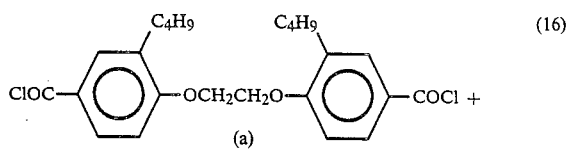
(16)
(a)

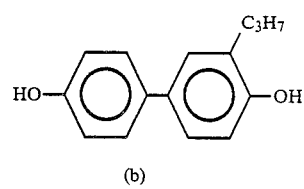
(b)

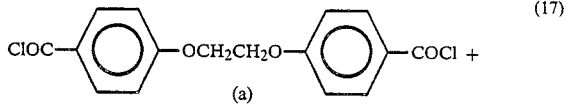
(17)
(a)

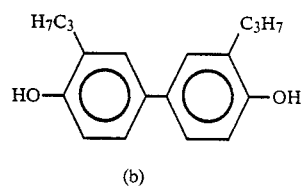
(b)

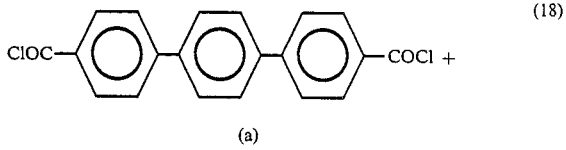
(18)
(a)

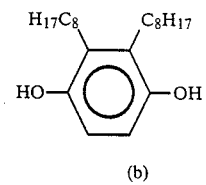
(b)

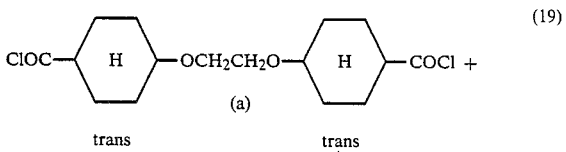
(19)
(a) trans    trans

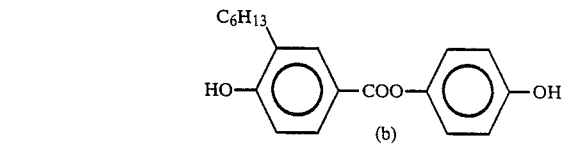
(b)

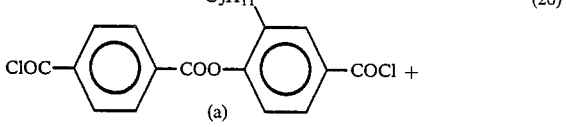
(20)
(a)

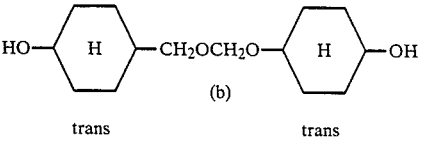
(b) trans    trans

-continued

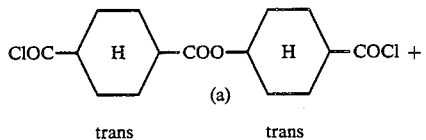 (21)

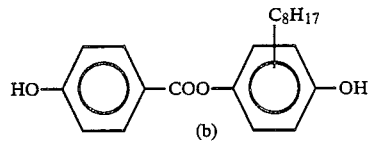

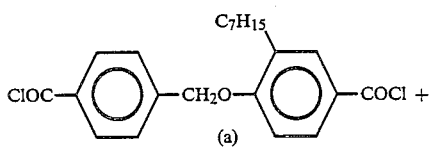 (22)

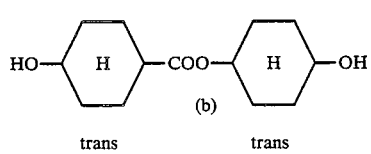

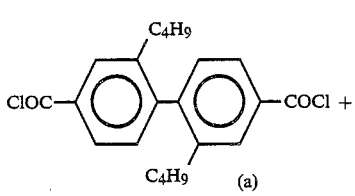 (23)

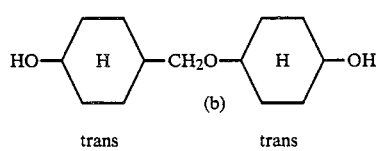

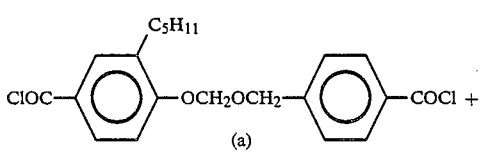 (24)

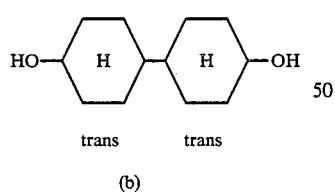

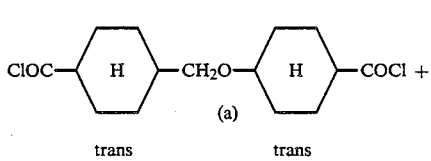 (25)

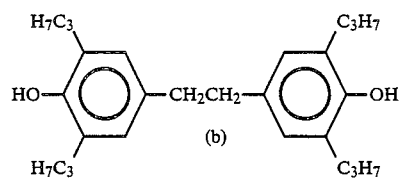

-continued

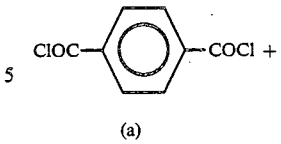 (26)

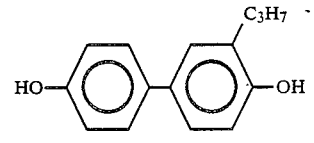

ibid (=26a) + 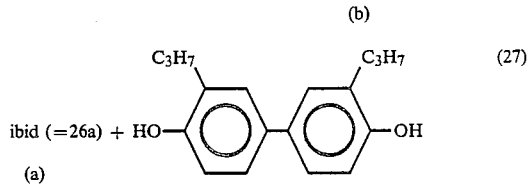 (27)

ibid (=26a) + 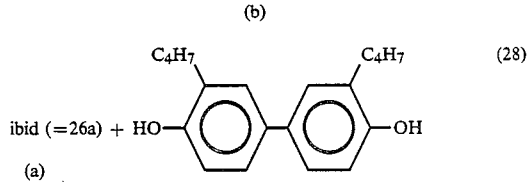 (28)

ibid (=26a) + 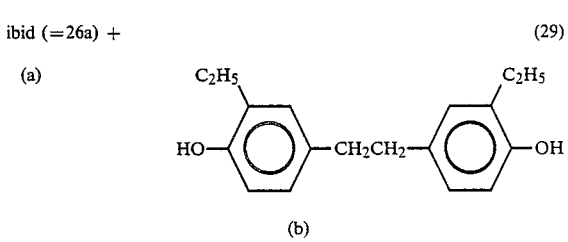 (29)

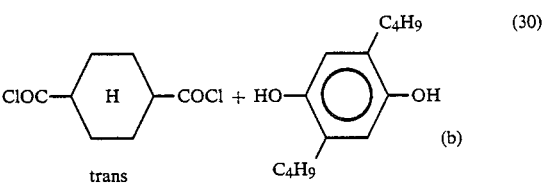 (30)

ibid (=30a) + 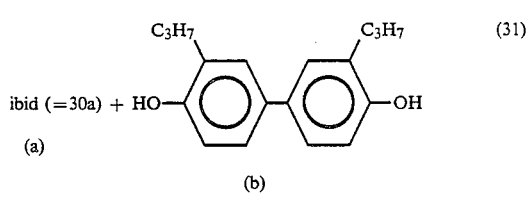 (31)

EXAMPLE 32

A solution of 1 mol of 4,4'-dihydroxy-3,3'-dipentyl-biphenyl, 2 mol of NaOH and 10 g of tetraethyl ammonium chloride in water was prepared in a blender at very low speed stirring. A second solution of 1 mol of 1,2-bis-(4-benzoyl chloride)-ethane in 1000 ml TCE was introduced into the blender jar rapidly while the stirring speed was increased simultaneously to near maximum. The stirrer was closed at once and stirring was continued for a minimum of 30 minutes. Then, hexane was added to precipitate the polymer; the precipitate was collected and washed repeatedly with water and alcohol.

The polymer was dried at 80° C. under reduced pressure and its inherent viscosity was 1 to 2 (dl/g). Post-heat treatment of the granulated polyester increased its molecular weight.

EXAMPLES 33-35

The procedure of Example 32 was used to produce a polyester from the following pair of reactants:

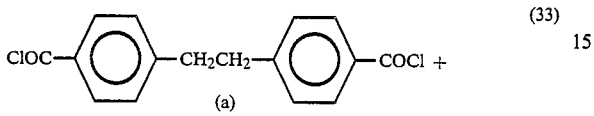
(33)
(a)

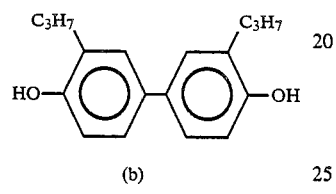
(b)

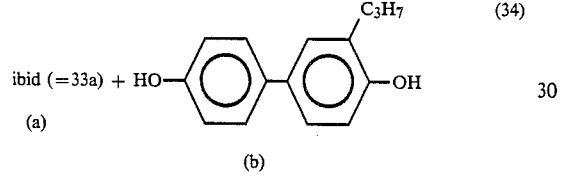
ibid (=33a) + (34)
(a) (b)

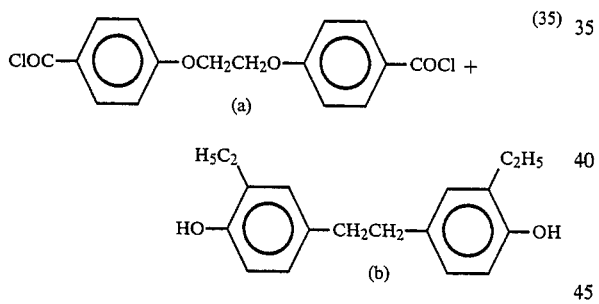
(35)
(a)

(b)

EXAMPLE 36

A mixture of 1 mol of 1,2-bis(4-trans-hydroxycyclohexyl)-ethane and 1 mol of 2,5-dipropyl terephthaloyl chloride was melted and held at the melting temperature for 60 minutes. The melt was vigorously stirred while passing a slow stream of $N_2$ through the reaction mixture.

The temperature was then raised to 280° C. and heating was continued for one hour at this temperature. The last traces of hydrogen chloride was removed by reducing the pressure to 0.5 to 1.0 torr. The reaction mixture was then cooled to room temperature.

The polymer formed was ground, washed with hexane and dried; the inherent viscosity was 2 to 3 (dl/g).

EXAMPLES 37-45

The procedure of Example 1 was used to obtain homopolyesters from the following hydroxy acids (a) or their functional derivatives as the sole monomer:

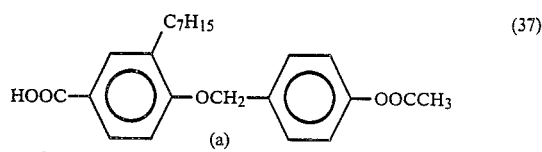
(37)

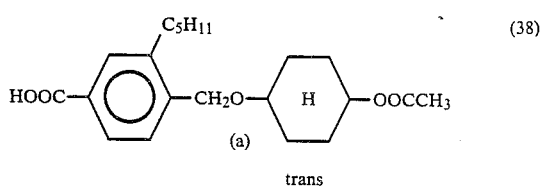
(38)

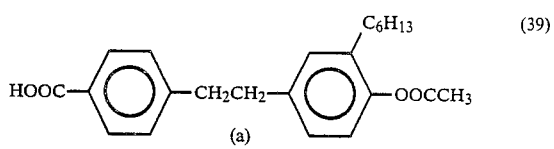
(39)

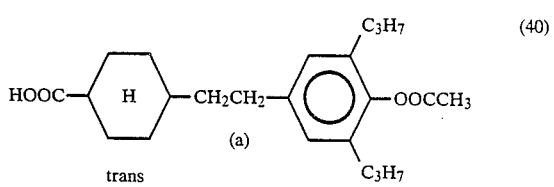
(40)

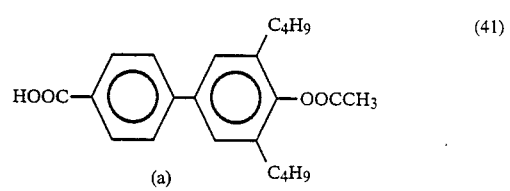
(41)

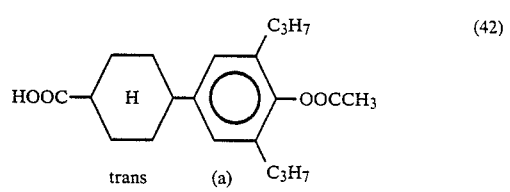
(42)

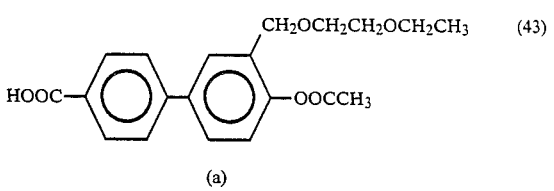
(43)

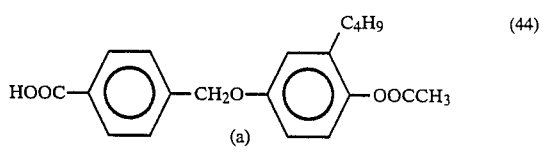
(44)

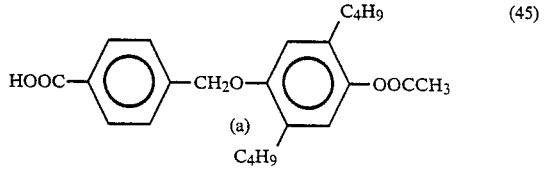
(45)

EXAMPLES 46–51
Copolyesters were obtained according to the procedure described in Example 11 by condensing the following reactants using mixed species of (a) or (b) monomer constituents:
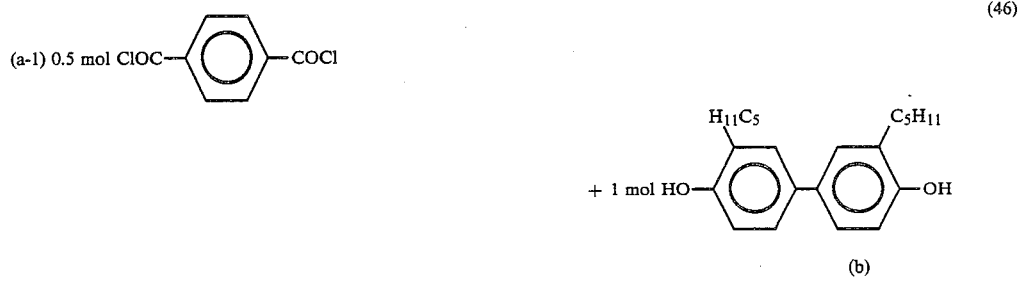
(46)
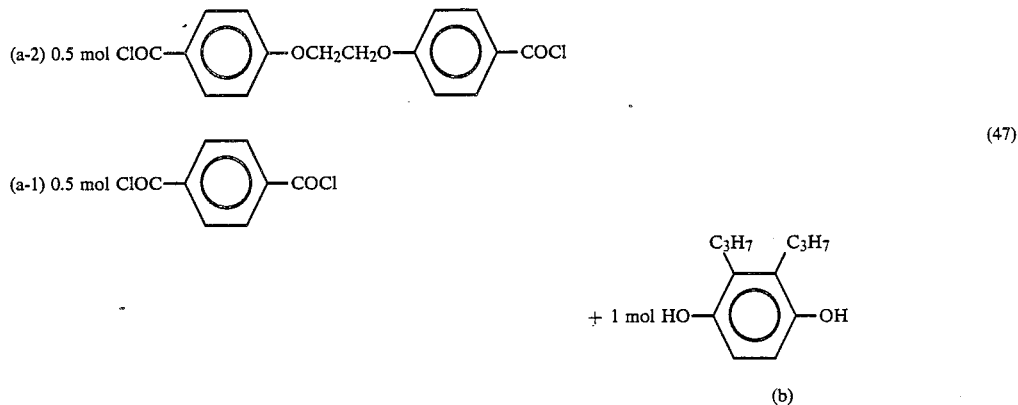
(47)
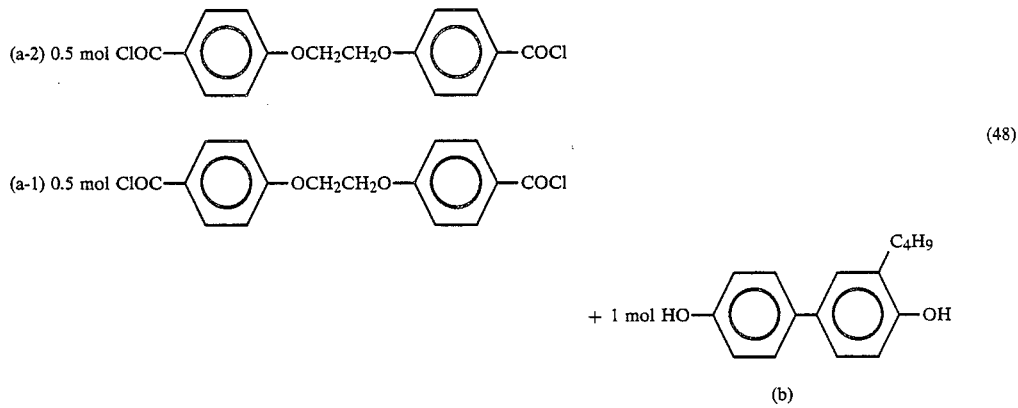
(48)
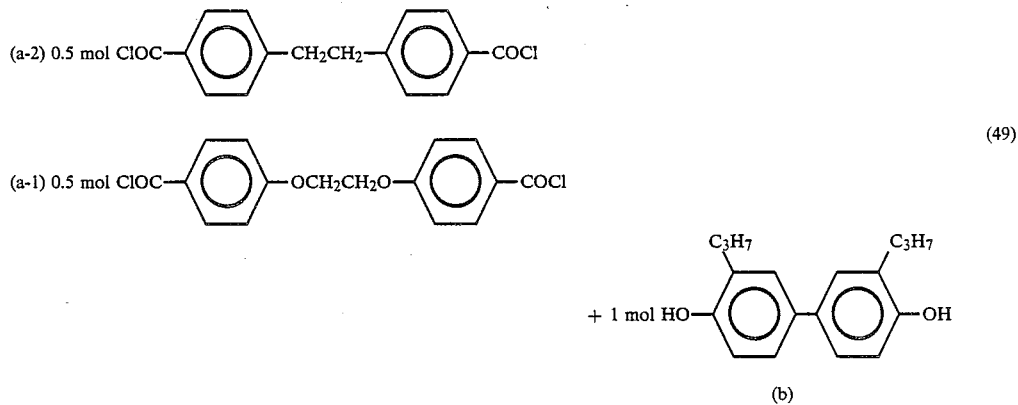
(49)
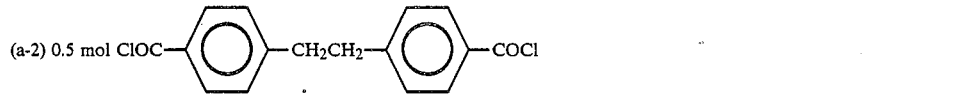

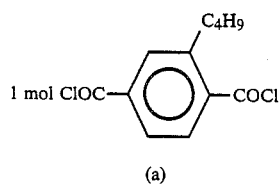

(a)

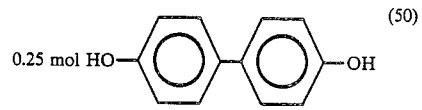

(b-1)

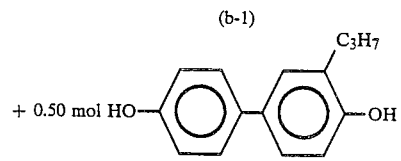

(b-2)

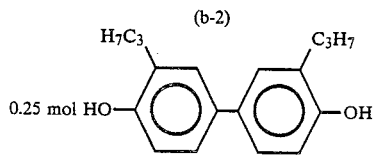

(b-3)

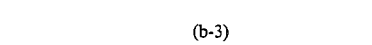

(b-1)

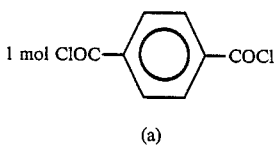

(a)

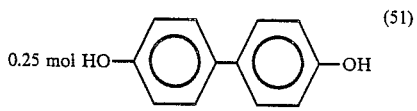

(b-1)

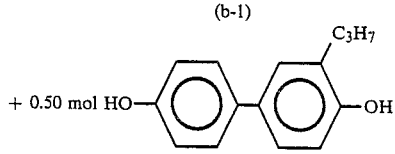

(b-2)

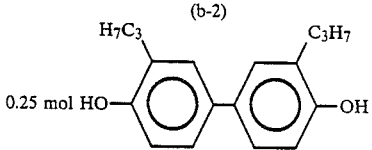

(b-3)

The inherent viscosity of these polymers was approximately 1 (dl/g).

EXAMPLE 52

Polyesters of formula (1) were melt-extruded from the mesophase below 350° C. into continuous filaments of approximately 26 deniers. The resulting fiber exhibited the following average single-filament properties in the as-spun state:

| tenacity | 3 to 5 (g/den) |
| --- | --- |
| tensile modulus | 150 to 200 (g/den) |
| elongation | 1.5 to 2 (%). |

When the filament product thus obtained was subjected to thermal treatment in a stream of dry nitrogen to near the polymer melting point, the filaments thus treated showed the following properties:

| tenacity | 10 to 20 (g/den) |
| --- | --- |
| tensile modulus | 300 to 600 (g/den) |
| elongation | 2 to 3 (%). |

Generally, the novel rodlike polyesters according to the invention tend to show a relatively high degree of crystallinity, and the amorphous part has a certain degree of orientational order in one or two directions such that the molecules exhibit a preferred direction of orientation. Orientation of the polymer chains in the flow direction of their solutions or melts can be enhanced by shear and/or elongational flow. Such methods are known and may be used to obtain anisotropic mechanical properties in the sense that they exhibit improved mechanical properties in the direction of orientation rather than across such direction. With polyesters of this invention, the lateral substituents tend to improve the mechanical properties across the orientation direction if compared with the corresponding prior art polyesters without lateral substitution.

The polyesters of the present invention are thermally stable so that their 10% weight loss point usually is substantially above 400° C. Accordingly, they can be melt-processed in a wide temperature range to form a variety of shaped articles, e.g. molded three-dimensional articles, fibers, films, tapes, etc. They may be molded by standard injection molding techniques. Fibers or films may be melt-extruded. Also, solubility in normal organic solvents for polyesters is substantially better than that of conventional rodlike polyesters.

Molding compounds may be formed from the polyesters of the present invention containing, for example, 1 to 60% by weight of a solid filler (e.g. talc, glass fibers, etc.). The subject polyesters may also be used as coatings applied as a powder or from a liquid dispersion or solution; also, films and membranes can be prepared from solutions by standard methods.

Polyesters according to the invention in which A, B, C, D of formula (1) represent 1,4-phenylene moieties show a superior fire safety performance, such as flame resistance and reduced smoke generation upon burning; molded or shaped articles manufactured from such polyesters tend to show improved dimensional stability if compared with conventional polyesters.

In another preferred embodiment of the invention polyesters of formula (1) will exhibit a clearing point ($T_c$) that is higher than the melting point ($T_m$); formation of a mesophase of the nematic type is particularly preferred and is realized in many polyesters according to the invention.

This aspect of the invention is believed to be of particular importance since it is known that liquids or melts will show a lower bulk viscosity when in nematic phase rather than in isotropic phase; lower viscosities, in turn, are known to be advantageous in melt processing and blends containing at least 5% of polyesters or copolyesters according to the pressent invention usually tend to show even lower viscosities than the nematic phase per se. Often, the addition of about 10 to 15% of polyesters or copolyesters according to the invention to conventional polymers tend to increase the elastic modulus and the tensile strength of the product, typically by a factor of about 2.

Frequently, optical, dielectric and other physical including mechanical properties of inventive polyesters that include recurring units of formula (1) will tend to be anisotropic when the subject polyesters, blends or copolyesters are processed in their mesophase such that the polymer chains are oriented in a preferred direction; selective diffusion of gases and liquids can be achieved in such oriented polyesters and the coefficients of expansion and heat transfer will also be anisotropic in the oriented state.

In general, the provisions of polyesters, blends and copolyesters characterized by recurring units of formula (1) as defined herein provide a variety of new and surprising advantages over prior art polyesters.

Hydroxylic, carboxylic and/or hydroxy carboxylic reactants for use in preparing the novel polyesters, copolyesters and blends are known per se or may be obtained by analogous methods from known compounds. For example, lateral substituents $X^1$, $X^2$, $X^3$, $X^4$ may be introduced by reaction of the corresponding unsubstituted hydroxylic, carboxylic or hydroxy carboxylic and preferably aromatic precursors with alkylating or acylating agents, optionally in the presence of such catalysts as $AlCl_3$, and reduction of the products obtained for transformation of lateral substituents if needed.

Alternatively or complementally, carboxyl and/or hydroxyl groups can be introduced into candidate compounds, and lateral substituents may be introduced prior or after forming the p-hydroxylic and/or p-carboxylic groups; precursor compounds containing one or two 1,4-cyclohexylene moieties can be obtained by hydrogenation of corresponding 1,4-phenylene compounds. For simplicity of synthesis it will frequently be preferred if the lateral substituents will be attached but to the 1,4-phenylene moieties of the reactants.

The required links Z ($Z^1$ to $Z^4$) may be preformed in the precursor compounds or formed by interreaction; when a linkage Z is to be the covalent bond, suitable reactants may be prepared from biphenyl or terphenyl precursors that include, or are capable to form, the hydroxylic and/or carboxylic functions in 4- and/or 4'-position and the lateral substituents in the desired 2-, 3-, 5- or 6- and/or 2'-, 3'-, 5'- or 6'-positions.

The other linkages Z according to the invention are either formed but by two carbon atoms or by two carbon atoms plus two oxygen atoms (excluding peroxy links —O—O— for obvious reasons of stability). Such linkages may be performed or obtained by interlinking of suitable precursors, e.g. by conventional methods of alkylation or formation of ether linkages.

Suitable methods for preparing the required reactants or precursors are apparent to those experienced in organic sysntheses.

Suitable modifications could be made to the reactants and reaction method described here without departing from the inventive concept. So, while certain preferred embodiments of the invention have been explained in some detail for illustration, it is to be understood that the invention is not limited thereto but may be otherwise embodied and practiced with the scope of the following claims.

What I claim is:

1. A linear rodlike polyester of controlled rigidity and packing density which melts below 350° C. and consists essentially of recurring units of the formula (1)

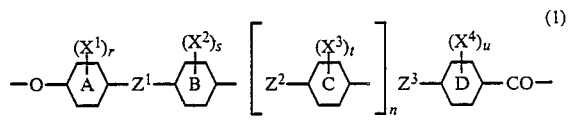

in which A, B, C and D are the same or different cyclic moieties selected from the group consisting of 1,4-phenylene and 1,4-cyclohexylene; n is Zero or 1; $Z^1$, $Z^2$ and $Z^3$ are the same or different and are selected from the group of bivalent links consisting of the covalent bond (—) and of linkages —COO—, —OOC—, —CH$_2$CH$_2$—, —CH$_2$O—, —OCH$_2$—, —OCH$_2$CH$_2$O—, —OCH$_2$OCH$_2$— and —CH$_2$OCH$_2$O—; $X^1$, $X^2$, $X^3$ and $X^4$ are the same or different and are selected from the group consisting of aliphatic substituents consisting of 2 to 8 carbon atoms in a straight or branched chain in which one, two or three of said carbon atoms may be replaced by oxygen atoms such that any said oxygen atom is directly attached to two of said carbon atoms of said chain; r, s, t and u are selected from the group consisting of Zero and integers of 1 to 4; with the provisos:

(a) that not more than two of $Z^1$, $Z^2$, $Z^3$ are —OCH$_2$CH$_2$O—, —OCH$_2$OCH$_2$— or —CH$_2$OCH$_2$O—;

(b) that at least one of r, s, t and u is not Zero;

(c) that not all of $Z^1$, $Z^2$ and $Z^3$ are the covalent bond or —COO— or —OOC— when all of A, B, C and D are 1,4-phenylene; and (d) that any of r, s, t and u is at least 2 when the corresponding cyclic moiety is an alkyl-substituted 1,4-phenylene linked directly by two oxygen atoms.

2. The polyester of claim 1 wherein r, s, t and u are selected from the group consisting of Zero and integers of from 1 to 2 such that at least one of A, B, C and D contains at least one of said saturated aliphatic substituents.

3. The polyester of claim 1 wherein the polyester consists essentially of chains of recurring units of the formula (1) in which A, B, C and D each are 1,4-phenylene.

4. The polyester of claim 1 wherein the polyester has a clearing point ($T_c$) which is higher than its melting point ($T_m$).

5. A polyester according to claim 1 comprising the condensation product of at least one carboxylic acid or a functional derivative thereof selected from the group consisting of compounds of the formulae (11) to (14)

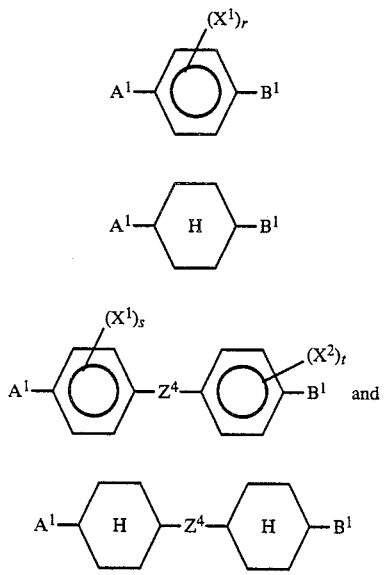

wherein:
A$^1$ and B$^1$ are the same or different and are selected from carboxyl, hydroxyl and functional derivatives thereof with the proviso that at least one of A$^1$ and B$^1$ is carboxyl or a functional derivative thereof; X$^1$ and X$^2$ are as defined in claim 1;
r, s and t are as defined in claim 1, and
Z$^4$ is selected from the group consisting of the covalent bond and linkages of the formulae —CH$_2$CH$_2$—, —CH$_2$O—, —OCH$_2$CH$_2$O— and —OCH$_2$OCH$_2$— with at least one hydroxy compound or a functional derivative thereof selected from the group consisting of compounds of the formulae (21) to (24)

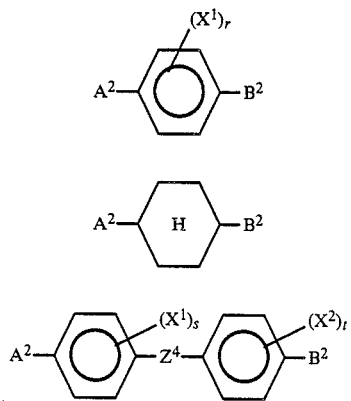

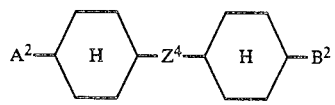

wherein A$^2$ and B$^2$ are the same or different and are selected from hydroxyl, carboxyl and functional derivatives thereof with the proviso that at least one of A$^2$ and B$^2$ is hydroxyl or a functional derivative thereof; X$^1$ and X$^2$ are as defined in claim 1; r, s and t are as defined in claim 1 and Z$^4$ is as defined herein.

6. A polymer blend consisting of at least about 5% by weight of a polyester according to claim 1.

7. A copolymer composed of at least about 20 mol % of recurring units of the formula (1) of claim 1.

8. An article of manufacture consisting at least in part of a polyester according to claim 1.

9. In the method of producing a polyester by condensing at least one carboxylic reactant or functional derivative thereof with at least one hydroxy reactant or functional derivative thereof; the improvement consisting essentially of (I) using as said carboxylic reactant at least one compound selected from the group consisting of compounds of the formulae (11) to (14)

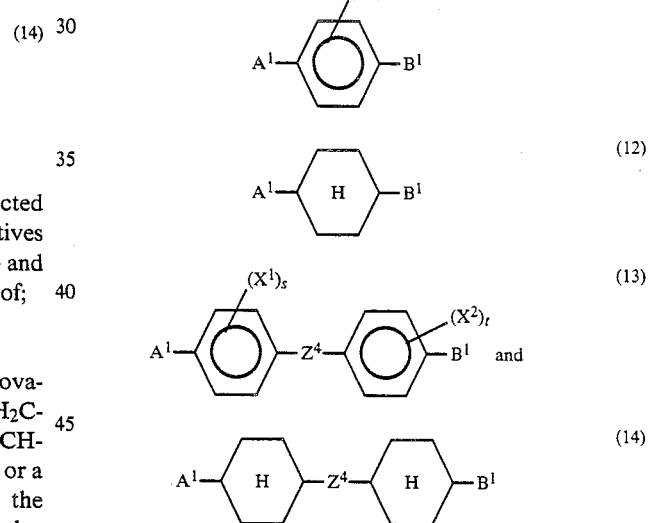

wherein A$^1$ and B$^1$ are the same or different and are selected from carboxyl, hydroxyl and functional derivatives thereof with the proviso that at least one of A$^1$ and B$^1$ is carboxyl or a functional derivative thereof; X$^1$ and X$^2$ are the same or different and are selected from the group consisting of aliphatic substituents consisting of 2 to 8 carbon atoms in a straight or branched chain in which one, two or three of said carbon atoms may be replaced by oxygen atoms such that any said oxygen atom is directly attached to two of said carbon atoms of said chain; r, s and t are selected from the group consisting of Zero and integers of 1 to 4; and Z$^4$ is selected from the group consisting of the covalent bond and linkages of the formulae —CH$_2$CH$_2$—, —CH$_2$O—, —OCH$_2$CH$_2$O— and —OCH$_2$OCH$_2$—; and (II) using as said hydroxy compound or functional derivative thereof a compound selected from the group consisting of compounds of the formulae (21) to (24)

(21) 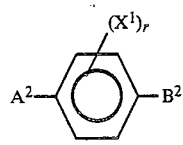

(22) 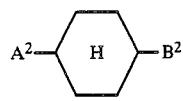

(23) 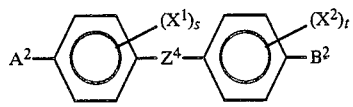

(24) 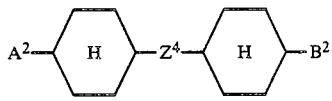

wherein $A^2$ and $B^2$ are the same or different and are selected from hydroxyl, carboxyl and functional derivatives thereof with the proviso that at least one of $A^2$ and $B^2$ is hydroxyl or a functional derivative thereof, and $X^1$ and $X^2$, r, s and t, and $Z^4$ are as defined above.

10. The method of claim 9 wherein said condensing step is effected under an inert atmosphere and/or under reduced pressure and wherein said polyester formed is subjected to a temperature treatment at an elevated temperature in the range of from about 150° C. to about 350° C. but below its melting point.

* * * * *